US007982903B2

(12) United States Patent
Edens (10) Patent No.: US 7,982,903 B2
(45) Date of Patent: Jul. 19, 2011

(54) METHOD AND SET OF INSTRUCTIONS FOR THE DOSED SUPPLY OF PRINTING INSTRUCTIONS TO A PRINTER, AND SYSTEM FOR PRACTICING THE METHOD

(75) Inventor: Bertus Karel Edens, Drachten (NL)

(73) Assignee: Neopost Industrie B.V., Drachten (NL)

( * ) Notice: Subject to any disclaimer, the term of this patent is extended or adjusted under 35 U.S.C. 154(b) by 537 days.

(21) Appl. No.: 12/000,526

(22) Filed: Dec. 13, 2007

(65) Prior Publication Data

US 2008/0098132 A1 Apr. 24, 2008

Related U.S. Application Data

(63) Continuation of application No. 10/233,423, filed on Sep. 4, 2002, now abandoned.

(30) Foreign Application Priority Data

Sep. 4, 2001 (NL) ...................................... 1018883

(51) Int. Cl.
*G06K 15/00* (2006.01)

(52) U.S. Cl. ......... 358/1.18; 399/75; 399/361; 399/381; 399/407; 399/76; 399/77; 399/78; 710/15; 710/17; 710/18; 710/19; 358/1.1; 358/1.15; 358/1.16; 358/406; 358/468

(58) Field of Classification Search .............. 399/75–78, 399/361, 381, 407; 710/15, 17–19, 176–182; 358/1.1, 1.15, 1.16, 406, 468
See application file for complete search history.

(56) References Cited

U.S. PATENT DOCUMENTS

| 4,128,756 | A | * | 12/1978 | Nagano et al. ..................... 377/8 |
| 4,627,222 | A | | 12/1986 | Cantile |
| 5,033,731 | A | | 7/1991 | Looney |
| 5,363,175 | A | * | 11/1994 | Matysek .......................... 399/77 |
| 5,471,564 | A | * | 11/1995 | Dennis et al. ................. 358/1.15 |
| 5,647,056 | A | | 7/1997 | Barrett et al. |
| 5,701,557 | A | * | 12/1997 | Webster et al. .................. 399/77 |
| 5,832,358 | A | * | 11/1998 | Sampath et al. .............. 399/405 |
| 6,249,835 | B1 | | 6/2001 | Isoda |
| 6,636,903 | B2 | | 10/2003 | Endoh et al. |

(Continued)

FOREIGN PATENT DOCUMENTS

DE 199 56 100 6/2000

(Continued)

*Primary Examiner* — Twyler L Haskins
*Assistant Examiner* — Michael Burleson
(74) *Attorney, Agent, or Firm* — Buchanan Ingersoll & Rooney PC (57) ABSTRACT

In the printing and finishing of sheet-like objects, printing instructions are outputted to a printer. In accordance therewith, sheet-like objects are printed by the printer and are subsequently delivered by the printer directly to the finishing apparatus and then finished by the finishing apparatus. Output data concerning the printing instructions sent to the printer which are at least indicative of the printer capacity required for the printer to process the printing instructions outputted to the printer are registered. Sheet-like objects displaced by the printer are detected and signaled by the detector. At least periodically, production data in accordance with the signals received from the detector are generated. These data are at least indicative of a production quantity realized by the printer in response to the printing instructions sent to the printer. Depending on the production data, the output of next ones of the printing instructions to the printer is dosed.

41 Claims, 4 Drawing Sheets

U.S. PATENT DOCUMENTS

| | | |
|---|---|---|
| 6,747,749 B1 | 6/2004 | Pollard et al. |
| 6,917,437 B1 | 7/2005 | Myers et al. |
| 2003/0081253 A1 | 5/2003 | Sekiguchi et al. |
| 2004/0021880 A1 | 2/2004 | Sugimoto et al. |

FOREIGN PATENT DOCUMENTS

| | | | |
|---|---|---|---|
| JP | 03174171 A | * | 7/1991 |
| JP | 03268986 A | * | 11/1991 |
| JP | 2000-158632 | | 6/2000 |

\* cited by examiner

METHOD AND SET OF INSTRUCTIONS FOR THE DOSED SUPPLY OF PRINTING INSTRUCTIONS TO A PRINTER, AND SYSTEM FOR PRACTICING THE METHOD

RELATED APPLICATIONS

This application is a Continuation of U.S. Ser. No. 10/233,423 filed on Sep. 4, 2002, now abandoned, and which claims priority under 35 U.S.C. §119 to Patent Application No. 1018883 filed in the Netherlands on Sep. 4, 2001, the content of which is incorporated herein by reference.

FIELD AND BACKGROUND OF THE INVENTION

This invention relates to a method according to the introductory part of claim 1, to a system according to the introductory part of claim 22 for practicing such method using a data processor system, and to a set of instructions for use therein.

Such a system and such a method are known from U.S. Pat. No. 5,283,752. When in-line printing and finishing sheet-like objects—such as in-line printing, combining with inserts, folding, inserting and franking documents within the framework of composing postal items—failures sometimes occur in the finishing process downstream of the printer.

In order to prevent accumulation of printed objects at the output of the printer, it is then useful to stop the supply of printing instructions to the printer. It is a problem here that modern printers contain a considerable memory, in which, in operation, a buffer stock of printing instructions is stored, which printing instructions are processed on demand and with some delay after having been outputted to the printer. If in response to a failure in the equipment for finishing printed objects the supply of printing instructions has been interrupted, a number of sheet-like objects will still be printed in accordance with printing instructions from the buffer stock.

Stopping the printing with a delay leads to paper waste. Objects printed during run-out of the printer and which could not be processed as a result of the failure must generally be removed by hand. Further, objects still printed and delivered after the occurrence of a failure (and before restart of the finishing apparatus) can run up onto the stationary, preceding objects. A potentially large number of objects still printed and delivered after the finishing apparatus has been stopped further makes it difficult to determine the printing instructions that are to be fed first to the printer at restart. Even if a buffer is provided (such as a first-in-first-out buffer for individual reception and delivery of objects as described in European patent application 0 927 693) for intermediate storage of objects between the printer and the apparatus for finishing the printed objects, it is disadvantageous if the number of objects still printed after a failure has occurred and the supply of printing instructions to the printer has accordingly been stopped is very large, since in that case the buffer must have a correspondingly great capacity.

SUMMARY OF THE INVENTION

It is an object of the invention to limit the number of documents that is still printed after stopping the supply of printing instructions to a printer with a buffer memory. It is a further object of the invention, within the framework of the capacity of the system, to realize production rates as high as possible.

According to the invention, this object is achieved by carrying out the printing and finishing of sheet-like objects according to what is laid down in claim 1. In addition, the invention provides, a system according to claim 22, with which, while using a conventional universal programmable data processor system, such a method can be practiced, and a set of instructions according to claim 28 for programming such a data processor system for use thereof within the framework of the proposed method.

The invention makes it possible to collect indications concerning the influence of the dosing of printing instructions to the printer on the productivity of the printer and, in accordance therewith, to choose the dosing such that, on the one hand, the amount of instructions in the memory of the printer is limited and, on the other hand, the productivity of the printer or at least of the combination of printer and finishing facilities is limited only slightly, if at all. Due to the dosing being controlled exclusively on the basis of parameters to be observed outside the printer, no intervention or adaptation to specific types of printers is required and the proposed method can be applied to a great variety of printers without extensive adaptation. Sometimes, however, it may be useful to set the dosing depending on the situation, for instance on the basis of empirical data and depending on the situation, for instance on the basis of empirical data and depending on the type of printer and/or the type of printings.

Particularly advantageous elaborations of the invention are laid down in the dependent claims. Further objects, practical aspects, advantages and details of the present invention will be described hereinbelow with reference to the drawing.

DETAILED DESCRIPTION

Figure 1:
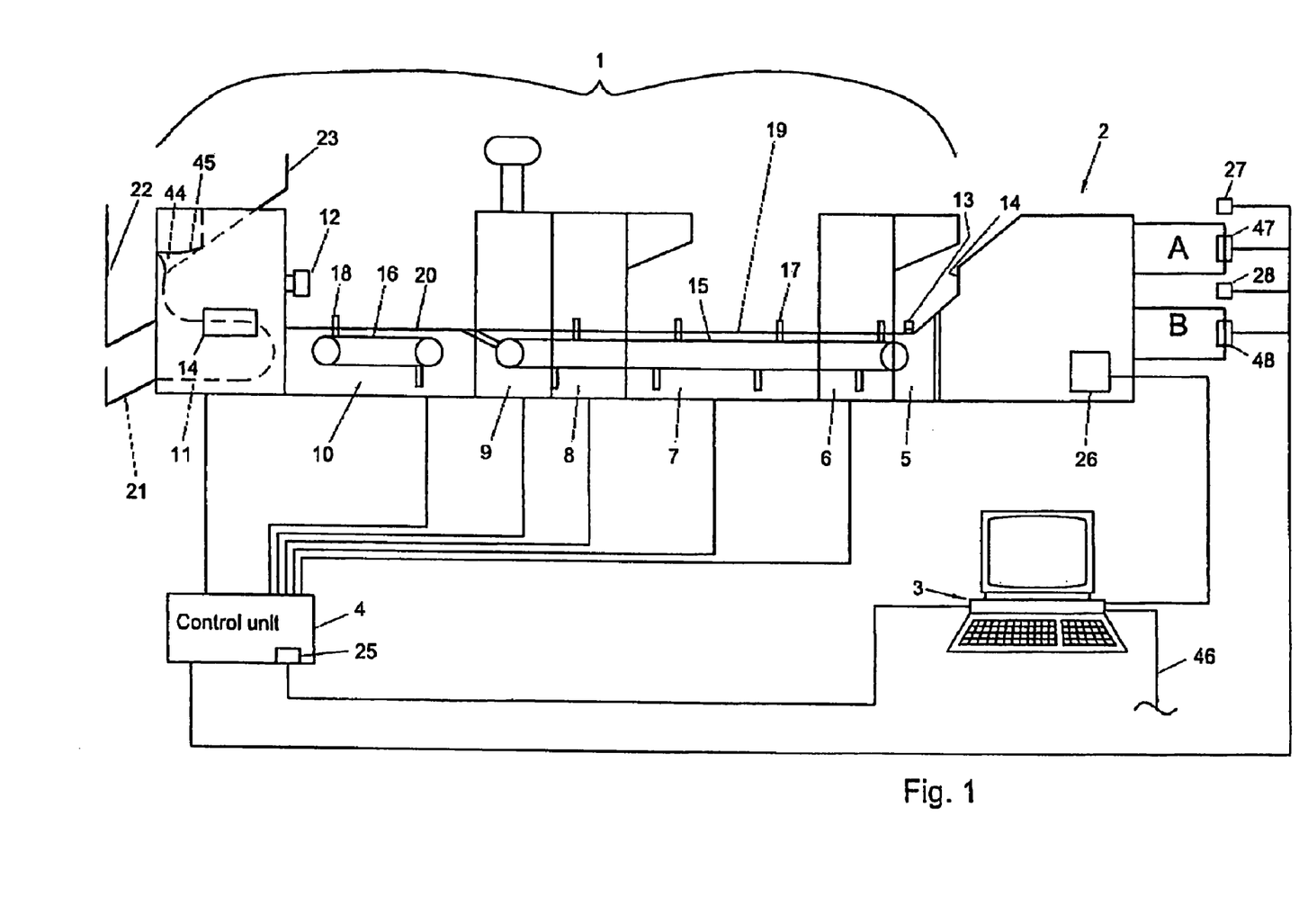
FIG. 1 is a diagrammatic representation, in side view, of an example of a system according to the invention.

The exemplary arrangement shown in FIG. 1 comprises an apparatus for finishing printed objects in the form of an inserter system 1 and a printer 2. The printer 2 may be of a common commercially available conventional type.

According to the example shown, both the inserter system 1 and the printer 2 are connected with a data processor system 3, in which data concerning the information to be printed on the documents and concerning the associated finishing data are stored. However, the invention may also be applied advantageously if the finishing is not controlled by the same computer as the printing. The finishing may, for instance, be controlled by another computer, directly or depending on data scanned from the printed objects, for instance by scanning bar codes or characters. The finishing may also take place for all objects of a series in the same manner, that is to say that on all objects of a series the same operations are carried out. The instructions for printing and finishing are, for instance, generated with the aid of a separate computer system and converted in the data processor system 3 to adapted instructions for the printer 2 and, according to this example, for the inserter system 1. For the purpose of communication with sources where data for, for instance, a mailing are generated, the data processor system 3 is included in a network 46 as a printing and inserter server.

The inserter system 1 is built up from a control unit 4 and, coupled therewith, a first insert feeding station 6 (also referred to as insert feeder) for feeding inserts, a conveying path 7, a second insert feeding station 8, a. folding station 9, an accumulating and conveying station 10 and an inserter station 11. The conveying path 7 extends through the insert feeding stations 6 and 8 and through the folding station 9. The upstream end of the conveying path 7 forms a feeding input 5 for feeding documents to be inserted to the inserter system 1 and to the inserter station 11. According to this example the feeding input 5 is arranged to receive one-by-one documents delivered by the printer 2. It is also possible that the printer is arranged to group objects, such as a number of sheets of the same document, and can deliver them simultaneously as a stack, optionally bound or otherwise joined together.

The second insert feeding station 8 is arranged to selectively deliver inserts directly to the folding station 9 or to the conveying path 7 extending under the folding station 9. Such an arrangement and construction of a second insert feeding station 8 and such an accumulating and conveying station 10 are described in more detail in U.S. Pat. No. 5,561,963.

The inserter station 11 is provided with a detector 12 for detecting the arrival of sets of sheets fed. The upstream end 5 of the conveying path 7 is provided with a detector 13 for detecting individual sheets, which, coming from the printer 2, reach the inserter system 1.

According to this example, the data processor system 3 and the control unit 4 together form the control means for controlling the inserter system 1. It is also possible, however, to construct the control means in a different manner. The inserter system 1 may, for instance, be controllable by a control unit of its own. That own control unit may, for instance, be formed by an associated standard computer, which controls the various functions of the inserter system via a suitable interface, or by a special, built-in control unit.

Located in the inserter station 11 is an inserting position 14, which is connected with the feeding input 5 through the conveying path 7 and the accumulating and conveying station 10.

The detectors 12, 13 are located between the feeding input 5 and the inserting position 14, so that they can detect and signal the arrival of sheets, in the first instance moved by the printer, in two places in the system. For that matter, detectors (not shown) that are conventionally arranged in the stations 6, 8, 9, 10, 11 or on the conveying path 10, may be provided as well, supplemental to the detectors 12, 13 or instead of the detectors 12, 13. In that case, for instance, the start of a finishing operation performed in response to the arrival of a sheet of set of sheets may be used as an indication that a sheet of set of sheets has reached the respective station. This provides the advantage that no separate detectors for detecting the arrival of a sheet of a set of sheets in the respective positions need to be provided.

The control unit 4 is arranged to count arrival signals originating from the detectors 12, 13. Furthermore, the control unit 4 is arranged to compare counted numbers of arrived documents or sets of documents with reference numbers following from data stored in the computer concerning the printing and finishing of documents and to generate an error message if the counted number of arrived documents or sets of documents and the associated reference number do not agree. Such an error message may be a reason for stopping the inserter system 1.

The printer 2 is provided with two sheet trays A and B and an output 14 for delivering sheets to the feeding input 5 of the inserter system 1. The conveying path 7 and the accumulating and conveying station 10 are provided with circulating conveyor belts 15. 16 provided with conveying fingers 17, 18 for receiving and advancing documents and inserts on guide surfaces 19, 20 of the conveying path 7 and the accumulating and conveying station 10. The inserter station 11 is provided with an envelope hopper 21 for holding a stock of envelopes and delivering one-by-one envelopes to be filled, a receiving holder 22 for receiving filled envelopes and a discharge holder 23 for receiving items not to be inserted and envelopes that should not (yet) be sealed up.

Located in the inserter station 11, downstream of the detectors 12, 13, is a switch 44. to which is connected a branch 45, which, in turn, leads to the discharge bolder 23. The control unit 4 is arranged to operate the switch 44 for shunting documents in response to a signal originating from the detector 13. Thus the objects not to be inserted or not to be sent immediately can be shunted to the deposition point 23. Consequently, these do not need be separated from the items destined for addressees.

According to this example, the system according to the invention is composed of the inserter system 1 for finishing sheet-like objects printed by the printer 2, a communication port 25 for connecting the detector 12 and/or 13 of the inserter system to a data processor system 3 for signaling to the data processor system detection by the detector 12 and/or 13 of the sheet-like objects conveyed by the printer 2; and a set of instructions in a form readable and processable by the data processor system 3. In combination with the printer 2 and the data processor system 3, which may both be of any commercially available type of one's choice, the examples of the proposed method described below may be applied.

The inserter system 1 forms the apparatus for finishing sheet-like objects printed by the printer 2 and has an input 5 for each time receiving directly from the printer each of the sheet-like objects printed by the printer 2. The inserter system 1 is further arranged to finish the sheet-like objects received from the printer 2 to obtain packaged postal items. Both the detector 12 and the detector 13 may be used to detect sheet-like objects displaced by the printer 2. It is also possible to derive the number of printed sheets from other events coupled thereto, such as numbers of franking provided on postal items, if franking, too, is carried out in line with the printing.

In response to a failure in the finishing apparatus 1 downstream of the printer 2, the sending of printing instruction sets to the printer 2 is stopped. The printer 2, however, is then still printing sheets and. delivers them until all the printing instruction sets sent to the printer 2 have been processed to yield printed sheet-like objects. The proposed measures ensure that, on the one hand, the number of sheets still printed and delivered after a failure in the inserter system 1 is limited and, on the other hand, the production rate of the printer 2, or at least the total system of printer 2 and inserter system 1, is limited only slightly, if at all, by a lack of printing instructions in the buffer memory 26 of the printer 2.

According to this example, the set of instructions is formed by a computer program, that is, software in a digital form which, whether or not after compilation, is processable by the data processor system.

Figure 2:
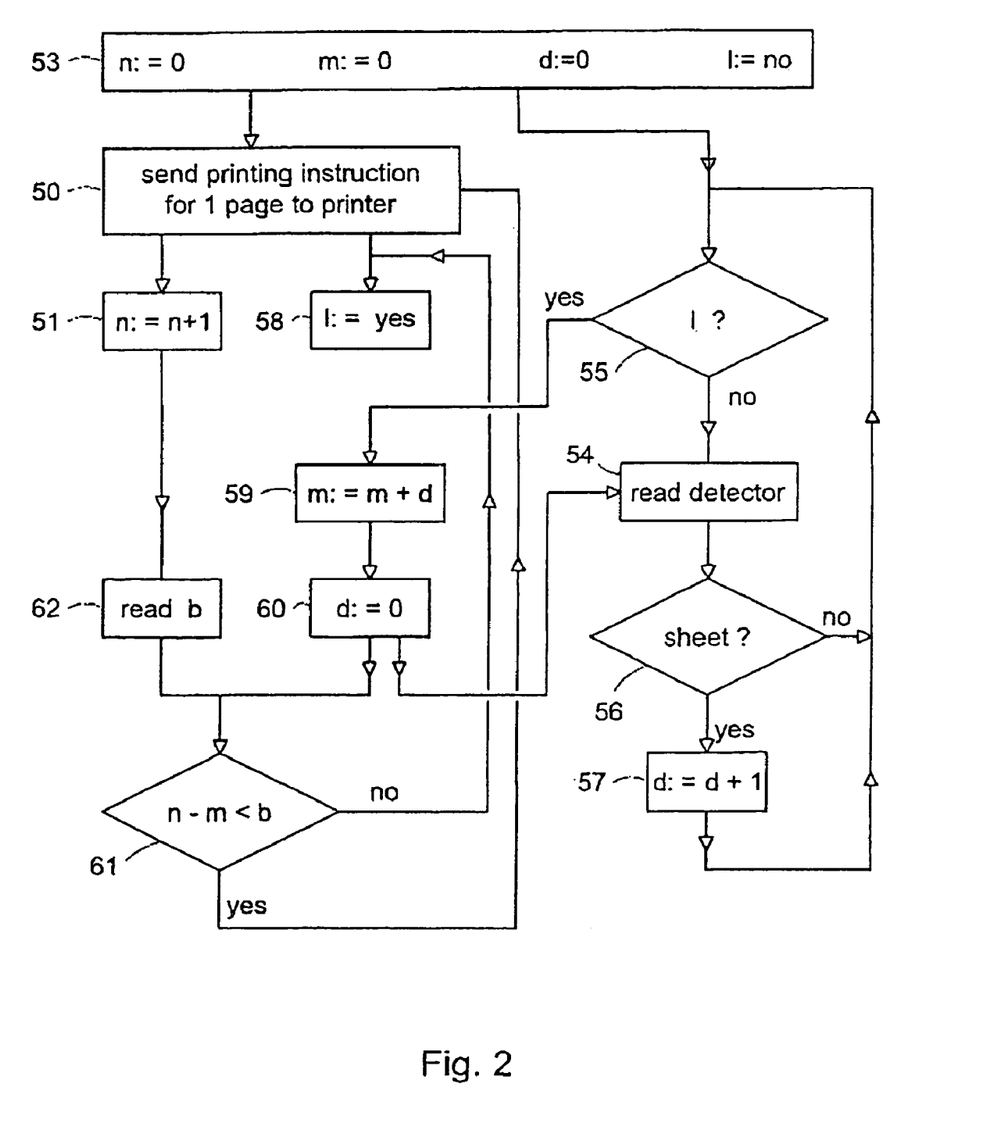
FIG. 2 is a flow diagram of an example of a control for dosing the supply of printing instructions to a printer.

The set of instructions according to the example shown in FIG. 2 contains, at least in installed condition, firstly instructions 50 for the data processor system 3 to send, to the printer, printing instructions which define printing to be printed on the sheet-like objects. These are instructions for actually outputting to the printer printing instructions that can form, for instance, the output of a printer driver. In principle, this may be carried out under various communication protocols, which protocols are known per so and are therefore not discussed further.

Further, the set of instructions according to this example includes instructions 51 for registering output data concerning the output of printing instructions to the printer 2, which registered output data are at least indicative of printer capacity required for carrying out the printing instructions sent to the printer 2. Printer capacity is herein understood to mean the claim imposed on one or more portions of the printer 2. According to this example, the claim on the printer capacity is expressed in terms of the number of pages to be printed when carrying out the printing instructions sent. This number is simply registered during step 51 by increasing a counter "n" by the value "1" each time after instructions for printing a page have been sent to the printer 2. This counter "n" is then set during an initialization step 53 to a start value "0" at the start of the processing of printing instructions for printing a series of printed objects.

Furthermore, the program contains instructions for at least periodically registering production data in accordance with signals received from the detector, which are at least indicative of a quantity of production realized by the printer 2 in response to the printing instructions sent to the printer 2. According to this example, the production data are formed by numbers of sheets detected by the detector 13.

Furthermore, the computer program contains instructions for dosing the sending of next printing instructions, depending on the production data. In particular, the instructions will ensure that, on the one hand, the amount of instructions in the buffer memory 26 of the printer 2 remains limited and, on the other hand, that amount is not limited to such an extent that this essentially limits the production rate of the printer. Examples thereof will be discussed hereinbelow.

Incidentally, it is possible to arrange the data processor system 3 especially for controlling the system as proposed and then to integrate it therein as well. This may offer advantages, for instance because then the putting into use requires less installation on data processor equipment.

If a data processor system 3, a printer 2 and an inserter system are already available, it is sufficient, for the practice of the method described hereinbelow in more detail, to have a suitably arranged set of instructions available in a form readable and processable by a data processor system. Thus the configuration already present can be rendered suitable for the application of the method proposed.

The method according to the example shown in FIG. 2 further provides a base cycle, with which the amount of information present in the buffer memory of the printer can be controlled or at least influenced.

The registering of sheets printed by the printer 2 is done by reading out the detector 13 (step 54) in a separate reading cycle. This cycle is traversed with a frequency so high that the cycle time is less than the time that a sheet is minimally detected by the detector. This ensures detection of each single sheet. By only registering switches from detection-no to detection-yes, double count of sheets is prevented. The reading cycle is also started with the initialization step 53. Then a variable "I" indicating if the process is in a reading mode (during which reading mode the variable "d" must not be changed to prevent missing of counts) is set to "no" and a counter "d", which updates the number of detected sheets, is set to zero.

The first step 55 of the reading cycle is to determine whether the process is in the reading mode. If this is not so, the detector is read out (step 54). Subsequently, it is verified in step 56 whether there is a switch from "no" sheet detection to "yes" sheet detection. If this is not so, step 55 is returned to. If a switch from no sheet detection to sheet detection, is detected, it is concluded that a sheet has arrived at the sensor 13 and in step 57 the value of the variable "d" is increased by "1".

During the initialization step 53, also a counter "in", which updates the number of counted sheets, is set to zero.

From a given moment, the printer prints one of the sheet-like objects in response to and in accordance with the printing instructions sent to the printer 2. This step does not take place under direct control by the data processor system 3 or the inserter system 1 and is therefore not shown in FIG. 2. Furthermore, this can be carried out with generally commercially available printers, so that a discussion thereof is not necessary for the practice of the proposed method.

Both last-mentioned considerations also hold for the step of each time directly delivering each of the sheet-like objects printed by the printer 2 from the printer 2 to the finishing apparatus formed by the inserter system 1, and this step, too, is not shown as such in FIG. 2.

The finishing by the inserter system 1 of the sheet-like objects delivered by the printer 2 to the finishing apparatus 1 can take place in a conventional manner and is therefore not described or discussed in more detail.

Each time, following the step 50 of sending instructions for printing a sheet and following a "no" result resulting from the step 61 of comparing the sent instructions with the realized production, the reading mode is activated by giving the variable "I" the value "yes" (step 58). The next time the reading cycle traverses the step 55 of determining whether the process is in the reading mode, the result of that step is "yes", and as next step 59 the counter "m" is increased by the current value of "d" representing the number of sheets detected since the last time the reading mode was operative. Subsequently, the counter "d" of the number of sheets detected since the last reading mode is set to zero (step 60). The reading cycle then proceeds to re-read the detector (step 54).

After the current data concerning the printing instructions sent to the printer and the realized printing production have been gathered, each time the question becomes relevant whether the instructions for printing the next sheet should now be sent to the printer 2. This question is answered by determining whether the difference between the number of sheets "n" for which printing instructions have been outputted to the printer 2 and the number of sheets "m" detected by the detector 13 does not exceed a specific maximum "b" (step 61). This maximum "b" has been read just before during a step 62 and has been chosen such that the number of sheets "b" for which printing instructions have been outputted, but for which the printing and delivery has not yet been completed is so large that the speed of the system is not inhibited by the buffer stock of printing instructions in the printer periodically getting empty. If the printer 2 is faster than the inserter system 1, at least at the employed settings of the inserter system 1, it is not disadvantageous to accept some speed reduction of the printer, as long as it does not fall below the maximum production rate of the inserter system at the given settings.

The reading of the detector and the updating of the counter "d" preferably takes place in a separate processor belonging to the detector. Communication with the detector is then each time only necessary in the reading mode. This is activated with a lower frequency than the reading out of the detector (step 54).

Detecting individual sheet-like objects conveyed by the printer and registering output data that are at least indicative of the number of sheet-like objects to be printed by the printer, as well as registering the production data by counting numbers of sheet-like objects detected by the detector, provides the advantage that the detection of sheet-like objects is relatively simple and that an exact relation between the data concerning the number of sheets according to the registered output data and the number of sheets to be eventually detected is relatively simple to realize, in particular if the printer is a Postscript printer which separately receives printing instructions for individual pages.

The production data can form both a direct representation of those data and an estimation of those data. A direct representation may, for instance, be the number, scanned by a sensor, of sheet-like objects delivered by the printer. An example of an indication of the number of delivered sheets is formed by the number of sheets taken up by the printer. For the detection of delivery of sheets the system according to FIG. 1 is provided with two detectors 27, 28, which can detect delivery of sheets from the trays A, B. These may, for instance, be microswitches capable of detecting the passage of a trailing edge of a sheet from the respective tray A, B. The number of sheets taken up by the printer forms a very early indication of the stage of processing of printing instructions by the printer, which enables a rapid response by supply of further printing instructions. The average amount of printing instructions in the buffer memory of the printer may thus be still smaller without this leading to regular losses of speed through shortage of printing instructions.

Because in the practice of the above-described example the registered output data are repeatedly compared with the registered production data, and the dosing of the output of the next printing instructions to the printer takes place, at least partly, depending on results of the comparisons, a direct control of the amount of printing instructions in the buffer memory 26 of the printer 2 is obtained, so that this amount can be kept relatively small without this having an essentially adverse effect on the speed of the printer.

For the direct control of the amount of printing instructions in the buffer memory 26 of the printer 2 it is further advantageous that the results of the comparisons between the registered output data and the registered production data are compared with a reference value "b" and that the dosing of next ones of the printing instructions takes place in response to the result of the comparison with the reference value "b".

The use of a reference value "b" further offers the advantage that the amount of printing data in the buffer memory of the printer can be simply increased and decreased by increasing or decreasing the reference value. Thus, by means of measurements of the production rate at different reference values, it can simply be experimentally determined what is the smallest reference value at which the system operates without essential loss of speed. If desired, some loss of speed may be accepted if this gives a substantial reduction of the amount of printing instructions in the buffer memory of the printer.

Also when using the same finishing apparatus/printer combination, however, the optimum reference value may vary strongly, for instance depending on the type of printing instructions (symbols or graphic, bit-map or vector, pre-loaded or not pre-loaded characters, etc.), the variation in printing and the production rate of the finishing apparatus feasible at the given setting. In order to be able to choose a favorable value of the reference value without experimental measurements, the setting of the reference value is preferably done automatically depending on quantity per unit time of production realized by the printer.

Figure 3:
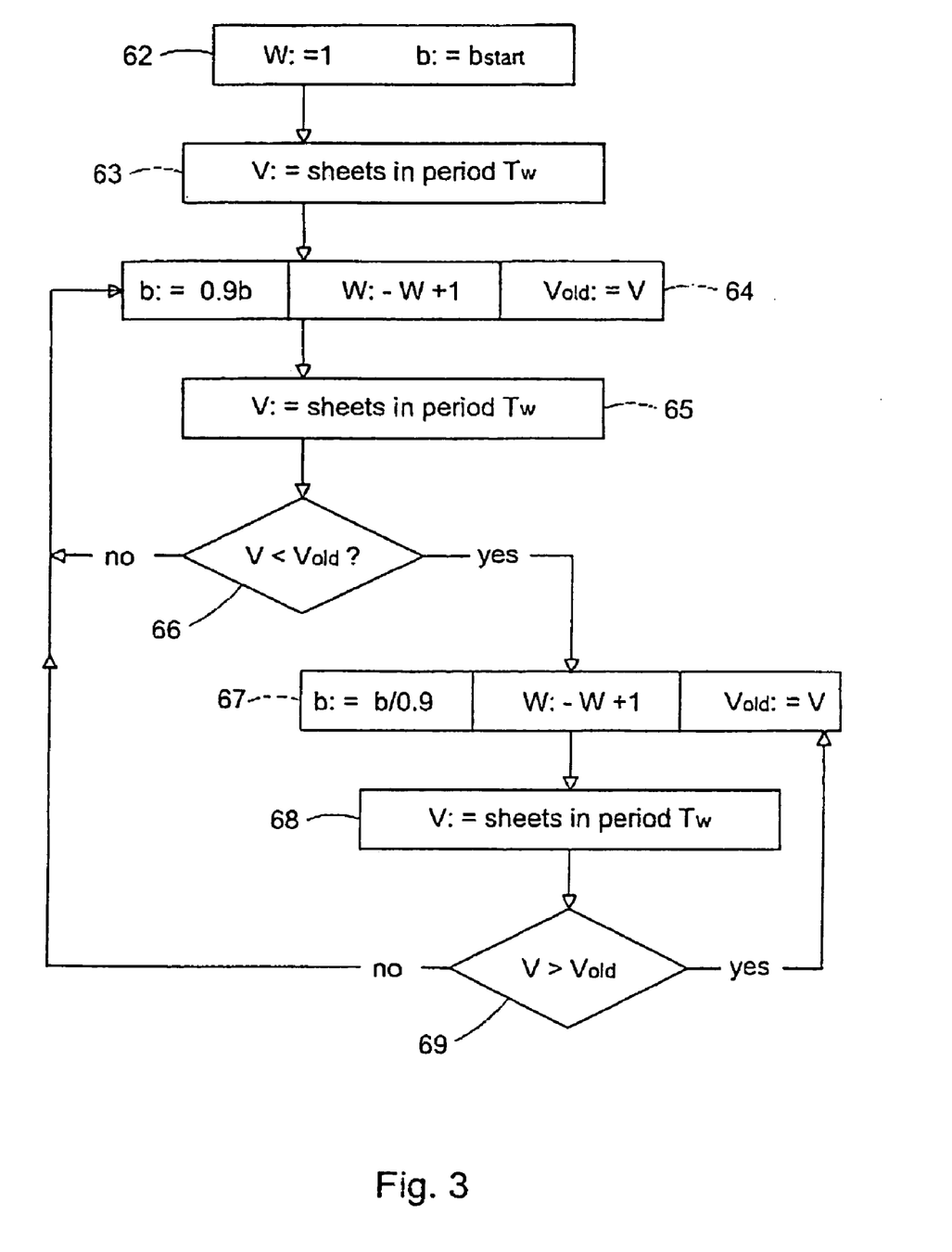
FIG. 3 is a flow diagram of an example of a control for controlling a parameter of the control shown in FIG. 2.

FIG. 3 shows an example of a flow diagram for automatically controlling the value reference value "b" depending on the realized printing production rate of the printer 2. The control of the reference value "b" begins with an initialization step 62. In this step the value of a counter "w" is set to 1 and "b" obtains a start value. This start value can be inputted by hand and, for instance, be expressed in a number of pages to which the printing instructions relate or in the quality of the printing instructions, for instance in kbytes. The start value may also be the value with which the printing and finishing of a previous series of documents has ended. Preferably, start values for "b" are coupled to so-called "job settings", so that for each type of operation occurring more often, and for which the ideal value of "b" will generally differ little from one time to the next, a matching value of "b" is set from the beginning of the production, and during the production only fine adjustment of the value of "b" will take place.

Subsequently, within a period of time $T_w$ the number of sheets that is printed is counted (step 63), and this value is assigned to variable "v". The counted value is assigned in a next shift step 64 to a variable "Void". Further, the counter "w" is increased and the value 0.9b is assigned to "b". The value of "b" is thus reduced. A more or less aggressively regulatory effect can be obtained by choosing the reduction factor smaller or greater. Subsequently, during a next period $T_w$ the number of sheets that is printed is counted again and assigned to the variable "v" (step 65). Then follows step 66 consisting of the comparison of "v" and "$V_{oId}$". If "v" is equal to or greater than "$V_{oId}$", step 64 is repeated, whereby the value of "b" is again reduced. If "v" is smaller than "$V_{oId}$", "b" is not reduced further, for the printer has slowed down. The next step is step 67 which is equal to step 64, except that "b" is increased again. Subsequently, during the next period of time $T_w$ the number of sheets that is printed is counted again and assigned to the variable "v" (step 68), and in step 69 the effect of increasing "b" on the speed of the printer 2 is determined. If "v" is greater than "$V_{oId}$", the next step is step 67, whereby "b" is increased again. If this is not the case, the next step is step 64, i.e., "b" is reduced.

In steps 66 and 69 other criteria may also be included, such as minimum differences or maximum velocities, for instance resulting from the maximum production rate of the finishing apparatus at a given setting. Also, the extent to which "b" is changed can be made dependent on the difference or the ratio between "v" and "$V_{oId}$".

According to the examples described above with reference to FIGS. 2 and 3, the output of printing instructions to the printer is each time initiated in response to new information concerning the realized production. In situations where the number of sheet-like objects to be printed forms a less good measure of the required printer capacity, the registered output data are preferably at least indicative of the amount of printing instructions that have been sent to the printer per unit of time, in other words: for the rate at which printing data have been sent to the printer. Such a situation occurs, for instance, if the response time to a command to output printing instructions to the printer varies strongly, if the printing instructions per unit to be sent to the printer (for instance, instructions for a page or for a document) vary strongly as regards data quantity or as regards processing time required by the printer, or if the interruption of the print flow is difficult to carry out. Instead of each time dosing the moment of sending next instructions, it is then especially advantageous to dose the amount of next printing instructions per unit of time.

The amount of printing instructions sent to the printer per unit of time may, for instance, be dosed by controlling the duration of the interval between the output of printing instructions to the printer for printing successive pages. The initial value of the duration of such an interval is preferably smaller than the duration of the interval after which the printer changes to a doze mode.

The transition of the printer to the doze mode causes an extreme reduction of the average printer speed, and this may cause artifacts in the response time, as a result of which the regulatory process does not respond by shortening the idle time. In order to prevent dozing of the printer, it is generally desirable to keep the idle time between the sending of sets of printing instructions for the printing of successive pages shorter than 10 seconds.

It is also possible, however, to control the rate at which printing instructions are sent to the printer in a different manner, for instance by varying the time between successive bytes. A suitable control range for the duration of the interval between successive bytes may then be, for instance, 0.5 to 3 milliseconds.

In combination with the above-described registering of data concerning printing instructions sent to the printer and realized printing production, the amount of printing instructions per unit of time can be outputted in response to these data. It is also possible, however, as in the example shown in FIG. 4, to arrange that the production data are at least indicative of the quantity per unit of time of production realized by the printer in response to the printing instructions sent to the printer, in other words, of the production rate, for instance expressed in sheets per minute. Dosing the output of printing instructions to the printer 2 in response to data that are at least indicative of the production rate offers the advantage that direct feedback occurs on the basis of the rate which also forms one of the properties of the process to be optimized.

This dosing can then be carried out with the intermediate step of influencing the size of the amount of instructions in the buffer memory 26 of the printer 2—as according to FIG. 3. However, dosing is also possible without monitoring how many printing instructions have been sent but have not yet resulted in printing production. Such a balance is, for instance, hard to update if the data concerning the detected production concern a different variable than the data concerning the printing instructions sent to the printer. This is, for instance, the case if the printing instructions are provided as files in a printer language that does not contain data concerning the number of pages, and the printing production is detected by detecting and registering the number of sheets taken up or delivered by the printer.

Figure 4:
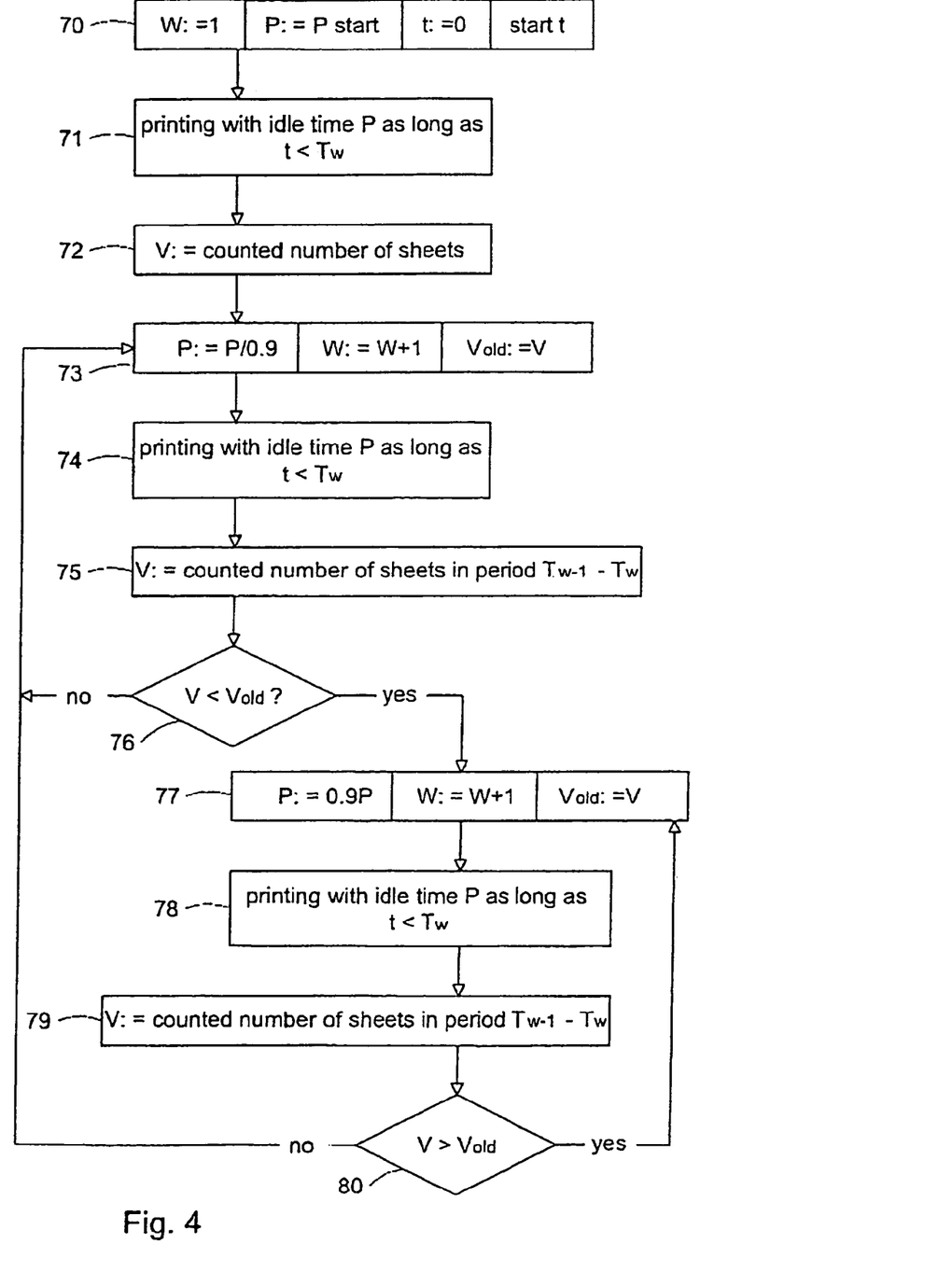
FIG. 4 is a flow diagram of a second example of a control for dosing the supply of printing instructions to a printer.

An example of such a manner of dosing the amounting of printing instructions outputted to the printer per unit of time is shown as a flow diagram in FIG. 4. During an initialization step 70 the value 1 is assigned to a counter "w", and the duration of the time interval "p" between sending successive bytes obtains a value "$P_{start}$" may be a standard value or be inputted by hand. Preferably, however, "$P_{start}$" has a value equal to a value of "p" reached before in operation, or of an (optionally weighted) average of such values. Just like the value "b" in the examples shown in FIGS. 2 and 3, the value "p" may preferably also be coupled to so-called job instructions, so that previously found values of the duration of time interval "p" are available—for generally similar printings— are available from the beginning of the printing and finishing process. An optimum value "p" is then generally reached sooner than when a more arbitrary value of "p" is started from. Finally, the variable "t" obtains the start value 0, and "t" is started, after which it runs up, controlled by a time-dependent signal.

Subsequently, printing and finishing are carried out during a period of time until a time limit "$T_w$" (step 71). After passing the time limit "$T_w$" a value equal to the number of sheets counted in the period until $t=T_w$ is assigned to a variable "v" (step 72).

Subsequently, as step 73, the duration of the time interval "p" between successive bytes of the printing instructions for a next period of time is extended by increasing it by a factor of 1/0.9. Here, too, a different factor may be chosen depending on the desired speed of the control behavior and the stability. The counter "w" is increased by the value 1, and the value "v" is assigned to the variable "void".

Subsequently, during a next period of time until the time limit "$T_w$" (the value "w" has meanwhile been increased) printing and finishing are carried out (step 74). After reaching the next time limit "$T_w$" a value equal to the number of sheets mounted in the period until $t=T_w$ is assigned to a variable "v" (step 75).

After printing has been carried out with two different time intervals between the successive bytes, it is established by comparing "v" and "$V_{oId}$" whether the extension of the time interval "p" has had a decelerating effect on the printing speed (step 76). If this is not the case or (depending on the accepted tolerances) is not the case to a substantial extent, step 73 is returned to, and the value of "p" is increased again for a next time interval. If during step 76 it is determined that the value of "v" has been reduced, step 77 is carried out as the next step. This is equal to step 74, albeit that the value of the time interval "p" between successive bytes of printing instructions is now reduced instead of increased, and hence the supply of printing instructions to the printer is accelerated.

Subsequently, during a next period of time until the time limit "$T_w$" (the value "$T_w$" has meanwhile been increased again) printing and finishing are carried out (step 78). After passing the time limit "$T_w$" a value equal to the number of sheets counted in the period until $t=T_w$ is assigned again to a variable "v" (step 79).

Subsequently, it is determined whether the printing speed has increased with respect to the preceding period of time by determining whether "v" is greater than "$V_{oId}$" (step 80). If this is not the case, a reduction of the time between successive bytes proves to yield no increase in the printing speed, and it is tried again whether increase of the time "p" is possible without essentially limiting the printing speed (steps 73-76). If the printing speed does prove to have increased, it is tried once again whether a reduction of the time between successive bytes yields an increase in the printing speed (steps 77-80). Thus the amount of printing instructions sent to the printer per unit of time is always kept near a value at which a reduction of that amount begins to have an adverse effect on the production rate.

If "p" is chosen too small, the memory of the printer fills up just as in conventional situations, in which the amount of printing instructions per unit of time outputted to the printer is not dosed. The limitation of the amount of printing instructions sent to the printer is then controlled in a conventional manner. Meanwhile the value of "p" is gradually increased without this affecting the printing speed, until the amount of printing instructions per unit of time sent to the printer has been smaller than the amount the printer can convert to printing production for a time so long that the buffer memory 26 of the printer 2 begins to become empty to the extent where this begins to affect the printing speed. In response to that phenomenon the value of "p" is reduced again from cycle to cycle.

Since printers used for printing large series of postal items generally require about 5-20 s to gain speed, the time duration of a cycle between $T_w$ and $T_{W+1}$ is generally preferably from 30-40 s to 60-90 s.

Especially if the rate or the moment of sending printing instructions is made completely or partly dependent on the production rate realized by the printer, it is important that the speed of the printer not be disturbed by phenomena that are not at least expressed in the registered output data or the registered production data.

Especially if the quantity of the printing instructions varies strongly from one sheet-like object to another, it is advantageous if the output data contain at least an indication concerning the quantity of the printing instructions sent.

In addition, the type of printing instructions typically also affects the processing rate of the printer. For instance, graphic images cost extra time (in relation to the quantity of the printing instructions), especially when vector representations and color images are concerned. If characters are to be printed, the type of character and the presence thereof in the memory of the printer generally has a decelerating effect on the processing rate. Provisions for improving the resolution and compressed files generally also cost much time. Disturbance of the dosing of the printing instructions due to variation regarding these properties can be prevented by including in the registered output data at least indications concerning the type of printing instructions. Also when detecting production data, data concerning the type of realized printing instructions can be registered for this purpose.

An extra reason why it is advantageous to include in the registered output data at least indications concerning the type of printing instructions is that the minimum amount of printing instructions in the buffer memory of the printer required for attaining the maximum printing speed can be different for different types of printing instructions. Thus, an optimum operation of a raster image processor when processing graphic printing instructions generally requires a larger amount of instructions in the buffer memory than when processing printing instructions consisting of signs. Other factors that for the purpose of fast processing generally require a relatively large amount of data in the buffer memory are: the use of resolution enhancement, vector representation (in comparison with bitmap representation), data compression and color (in comparison with black-and-white). If it is known that of a specific type of printing instructions more data are required in the buffer memory to attain the optimum printer speed, it is therefore advantageous for printing instructions of that type to be sent to the printer earlier or at a higher data transmission rate.

In order to automatically gather information for a printer concerning the influence of different properties of the printing instructions or the production data, such as the type of printing instructions (for instance signs or graphic), the quantity, the number of pages, numbers of applied signs and the size of the surface of the printing, it is advantageous if the influence on the processing time of different properties of the printing instructions or the production data is observed and is processed by multivariate statistic analysis to empirical rules for predicting the processing time starting from properties of the printing instructions to be output to the printer. Thus the influence of such properties for a specific type of printer can be automatically gathered empirically.

To further limit paper waste in case of a failure occurring downstream of the printer 2, paper supply blockers 47, 48 are provided at the paper feed of the printer. In response to a message of a failure to the control unit 4 these paper blockers are activated for blocking the paper feed of the printer 2. Thus the printing of further sheets is prevented and restarting the system is simplified, because fewer sheets or no sheets at all need to be removed therefrom and. because many printers are arranged to reprint a sheet after a failure in the paper transport has been detected. The paper blockers simulate such a failure in response to a report on an actual failure in the finishing system 1. The paper blocker may, for instance, be constructed as a pre-stressed clamp released in response to a failure for clamping together the sheets in the trays A and B, respectively, so that the printer 2 does not succeed in taking up sheets from the trays. A special advantage of the use of paper blockers acting on the paper feed of the printer is that they are applicable very universally, because no internal intervention in or adaptation to the control of the printer is required and yet a very rapid reaction to failures downstream of the printer can be obtained.

The invention claimed is:

1. A method for printing and finishing a series of sheet-like objects utilizing a data processor system, a printer and a finishing apparatus having a detector for detecting arrived sheets, comprising the steps of:
    A) storing within the data processor system a set of printing instructions defining printings to be printed on the sheet-like objects;
    B) successively outputting successive portions of the stored set of printing instructions from the data processor system to the printer;
    C) printing said sheet-like objects in response to and in accordance with the successive portions of the printing instructions outputted to the printer;
    D) delivering the printed sheet-like objects from the printer directly to an input of the finishing apparatus;
    E) finishing the delivered sheet-like objects within the finishing apparatus; and
    F) programming the data processor system to perform, during step C, the steps of:
        F1) at least periodically registering output data in response to the outputting of the successive printing instructions to the printer, which registered output data are at least indicative of printer capacity required to process the printing instructions outputted to the printer;
        F2) detecting the arrival of individual sheet-like objects from the printer and generating signals representing such detected sheet-like objects;
        F3) at least periodically registering production data in accordance with the generated signals, which production data are at least indicative of a quantity of printed production realized by the printer in response to the printing instructions sent to the printer;
        F4) at least periodically determining timing instructions from the production data; and
        F5) at least periodically controlling the timing of the outputting of next successive portion of the stored set of printing instructions of step A) in accordance with the timing instructions,
        F6) wherein the timing instructions are determined for delaying or advancing the outputting of said next successive portion of the stored set of printing instructions in response to a difference between the printed production and the required printer capacity relative to a threshold value.

2. A method according to claim 1, wherein the printing instructions of step A contain printing instruction sets which each define at least one printing to be printed on at least one of the sheet-like objects, and wherein said timing instructions each time control a moment of sending a next one of the printing instructions sets.

3. A method according to claim 1, wherein the registered output data of step F1 are at least indicative of a number of sheet-like objects to be printed by the printer and wherein registering said production data comprises counting numbers of sheet-like objects transported by the printer.

4. A method according to claim 1, wherein the registered output data of step F1 are at least indicative of a number of documents to be printed by the printer, wherein at least one of said documents is composed of several of said sheet-like objects, and wherein registering the production data comprises detecting documents and counting numbers of detected documents.

5. A method according to claim 1, wherein the registered output data of step F1 are at least indicative of the quantity of the printing instructions outputted to the printer.

6. A method according to claim 1, wherein the registered output data of step F1 are at least indicative of printing instructions outputted to the printer of a type requiring relatively much processing time are outputted to the printer in an accelerated manner.

7. A method according to claim 1, wherein the timing instructions of step F4 are determined on the basis of a printing processing time predicted by statistical analysis.

8. A method according to claim 1, wherein the registered output data are at least indicative of the time required for the printer to execute the printing instructions outputted to the printer.

9. A method according to claim 1, wherein the scanning data obtained by scanning printings applied by the printer are compared with registered output data concerning printing instructions in the data processing system which identifies the printing instructions as executed if at least a particular extent of agreement between at least portions of the scanning data and at least portions of the registered output data has been found.

10. A method according to claim 1, wherein the registered output data are at least indicative of the amount of printing instructions which have been outputted to the printer per unit of time.

11. A method according to claim 10, wherein the production data are at least indicative of the quantity per unit of time of production realized by the printer in response to the printing instructions sent to the printer.

12. A method according to claim 10, wherein the value of a variable which determines how many printing instructions per unit time are outputted to the printer is controlled by the data processing system in response to the quantity per unit of time of production realized by the printer in response to the printing instructions sent to the printer.

13. A method according to claim 1, further comprising at least repeatedly comparing the registered output data with the registered production data, wherein the determination of at least one next one of the timing instructions is made, at least partly, depending on results of the comparisons.

14. A method according to claim 13, further comprising:
each time comparing the results of the comparisons with a reference value in the data processing system; and
determining at least one next one of the timing instructions in accordance with the result of the comparison with the reference value.

15. A method according to claim 14, further comprising causing the data processing system to set the reference value depending on quantity per unit of time of production realized by the printer in response to the printing instructions sent to the printer.

16. A method according to claim 10, wherein the number of printing instructions per unit time outputted to the printer is determined by comparing, within the data processing system, the threshold value to a difference between the registered output data and the registered production data.

17. A method according to claim 13, wherein the results of the comparison of the registered output data with the registered production data are at least indicative of the quantity of as yet unprocessed printing instructions outputted to the printer.

18. A method according to claim 13, wherein the results of the comparison of the registered output data with the registered production data are at least indicative of the number of pages to be printed according to as yet unprocessed printing instructions outputted to the printer.

19. A method according to claim 1, wherein in response to a failure in the finishing apparatus downstream of the printer, after elimination of the failure, at least a portion of printing instructions sent to the printer of which the associated printing has already been printed is again outputted to the printer for again printing at least one sheet-like object in accordance with said portion of the printing instructions.

20. A system for finishing series of sheet-like objects printed by a printer, comprising a finishing apparatus having an input for receiving directly from the printer sheet-like objects printed by the printer, and arranged for finishing the sheet-like objects received from the printer;
a detector for detecting at least individual sheet-like objects arrived from the printer and generating signals representing detection of individual sheet-like objects arrived from the printer;
a communication port for connecting the detector to a data processor system for signaling to the data processor detection by the detector of at least sheet-like objects transported by the printer; and
a set of printing instructions defining printings to be printed on the sheet-like objects and stored in the data processor system in a form readable and processable by the data processor system, wherein the data processor system is programmed for:
successively outputting to the printer successive portions of the stored set of printing instructions defining printings to be printed on the sheet-like objects; and
during the printing of the sheet-like objects of at least one of said series, at least periodically:
registering output data in response to the outputting of the successive printing instructions to the printer, which registered output data are at least indicative of printer capacity required to process the printing instructions outputted to the printer;
registering production data in accordance with the generated signals which production data are at least indicative of a quantity of printed production realized by the printer in response to the printing instructions sent to the printer;
determining timing instructions from the production data; and
controlling the timing of the outputting of the next successive portion of the stored set of printing instructions to the printer in accordance with the timing instructions,
wherein the timing instructions are determined for delaying or advancing the outputting of said next successive portion of the stored set of printing instructions in response to a difference between the indicated printer capacity and the realized quantity of printed production relative to a threshold value.

21. A system according to claim 20, wherein the detector is arranged for detecting individual sheet-like objects arrived from the printer, and wherein the instructions of said set are arranged for registering output data which are at least indicative of the number of sheet-like objects to be printed by the printer and for registering said production data by counting numbers of sheet-like objects detected by the detector.

22. A system according to claim 20, further comprising an accumulation station for accumulating sheet-like objects printed by the printer to form documents which may each comprise several of said sheet-like objects, wherein the detector is arranged downstream of the accumulation station for detecting individual documents accumulated by the accumulation station, and the instructions of said set are arranged for registering output data which are at least indicative of the number of documents to be printed by the printer, wherein at least one of said documents can comprise several of said sheet-like objects, and for registering said production data by counting numbers of documents detected by the detector.

23. A system according to claim 20, wherein the detector is arranged for detecting displacement of sheets from a supply holder of the printer.

24. A set of printing instructions defining printings to be printed on sheet-like objects and stored within a non-transitory form readable and processable by a data processor system, for determining the timing of sending successive portions of the stored set of printing instructions to a printer in response to signals received from a detector separate from the printer, which signals are at least indicative of a quantity of individual sheet-like objects arrived from the printer in response to previous portions of the stored set of printing instructions sent to the printer, comprising instructions residing on a non-transitory, tangible computer readable medium, wherein the data processor system is programmed for:
  successively outputting to the printer successive portions of the stored set of printing instructions defining printings to be printed on series the sheet-like objects; and
  during the printing of the sheet-like objects of at least one of said series, at least periodically:
    registering output data in response to the outputting of the successive portions of the stored set of printing instructions to the printer, which registered output data are at least indicative of printer capacity required to execute the printing instructions outputted to the printer;
    registering production data in accordance with signals received from said detector, which production data are at least indicative of a quantity of printed production realized by the printer in response to the printing instructions sent to the printer; and
    determining timing instructions from the production data; and
    controlling the timing of the outputting of next successive portion of the stored set of printing instructions to the printer in accordance with the timing of the instructions,
  wherein the timing instructions are determined for delaying or advancing the outputting of the next successive portion of the stored set of printing instructions in response to a difference between the indicated printer capacity and the realized quantity of printed production relative to a threshold value.

25. A set according to claim 24, wherein the instructions for determining said timing instructions are arranged for distinguishing sequences of said printing instructions for printing at least one sheet-like object and for carrying out said determination by each time determining moments of sending said sequences of said printing instructions.

26. A set according to claim 24, further comprising instructions for registering the output data in a form which is at least indicative of the quantity of the printing instructions outputted to the printer.

27. A set according to claim 24, further comprising instructions for registering the output data in a form which is at least indicative of printing instructions outputted to the printer of a type requiring relatively much processing time.

28. A set according to claim 24, further comprising instructions for determining the timing instructions on the basis of a printing processing time predicted by statistical analysis.

29. A set according to claim 24, further comprising instructions for registering the output data in a form which is at least indicative of the time minimally required for said printer to execute the printing instructions outputted to the printer.

30. A set according to claim 24, further comprising instructions for comparing scanning data obtained by scanning printings applied by the printer with registered output data and for identifying printing instructions as executed if at least a particular extent of agreement between at least portions of the scanning data and at least portions of the registered output data has been found.

31. A set according to claim 24, further comprising instructions for registering the output data in a form which is at least indicative of an amount of printing instructions which has been outputted to the printer per unit of time.

32. A set according to claim 31, further comprising instructions for generating the production data in a form which is at least indicative of a quantity per unit of time of production realized by the printer in response to the printing instructions sent to the printer.

33. A set according to claim 32, further comprising instructions for controlling the value of a variable of the timing instructions which determines how many printing instructions per unit of time are outputted to the printer, in response to the quantity per unit of time of production realized by the printer in response to the printing instructions sent to the printer.

34. A set according to claim 24, further comprising instructions for at least repeatedly comparing the registered output data with the registered production data, and for determining at least one next one of the timing instructions, at least partly, depending on results of the comparisons.

35. A set according to claim 32, further comprising instructions for each time comparing the results of the comparisons with a reference value; and for determining at least one next one of the timing instructions in accordance with the result of the comparison with the reference value.

36. A set according to claim 34, further comprising instructions for setting the reference value depending on quantity per unit of time of production realized by the printer in response to the printing instructions sent to the printer.

37. A set according to claim 31, further comprising instructions for determining the number of printing instructions per unit time outputted to the printer by comparing the threshold value to a difference between the registered output data and the registered production data.

38. A set according to claim 34, further comprising instructions for generating the results of the comparison of the registered output data with the registered production data in a form which is at least indicative of the quantity of as yet unprocessed ones of the printing instructions outputted to the printer.

39. A set according to claim 34, further comprising instructions for generating the results of the comparisons of the registered output data with the registered production data in a form which is at least indicative of the time which the printer minimally requires for processing as yet unprocessed ones of the printing instructions outputted to the printer.

40. A set according to claim 34, further comprising instructions for generating the results of the comparison of the registered output data with the registered production data in a form which is at least indicative of the number of pages to be printed according to as yet unprocessed ones of the printing instructions outputted to the printer.

41. A set according to claim 24, further comprising instructions for, in response to a signal representing a failure in the finishing apparatus downstream of the printer, after elimination of the failure, again outputting to the printer at least a portion of printing instruction sets sent to the printer of which the associated printing has already been printed, for again printing at least one sheet-like object in accordance with said portion of the printing instructions.

* * * * *